US006603795B2

(12) United States Patent
Ma et al.

(10) Patent No.: US 6,603,795 B2
(45) Date of Patent: Aug. 5, 2003

(54) POWER CONTROL SYSTEM FOR AC ELECTRIC ARC FURNACE

(75) Inventors: Thomas Lai Wai Ma, Toronto (CA); Mohammad Sedighy, Mississauga (CA); Brian Kenneth Perkins, Mississauga (CA); Theodorus Anthonius Gerritsen, Oakville (CA); Janos Rajda, Mississauga (CA)

(73) Assignees: Hatch Associates Ltd., Mississauga (CA); Satcon Power Systems Canada Ltd., Burlington (CA)

(*) Notice: Subject to any disclaimer, the term of this patent is extended or adjusted under 35 U.S.C. 154(b) by 0 days.

(21) Appl. No.: 09/778,835

(22) Filed: Feb. 8, 2001

(65) Prior Publication Data

US 2002/0136260 A1 Sep. 26, 2002

(51) Int. Cl.⁷ .......................... H05B 7/144; H05B 7/148
(52) U.S. Cl. .......................... 373/102; 373/105
(58) Field of Search ................... 373/102–108

(56) References Cited

U.S. PATENT DOCUMENTS

| | | | |
|---|---|---|---|
| 2,450,159 A | 9/1948 | Pickslay | |
| 2,632,862 A | 3/1953 | Stoltz | |
| 3,597,518 A | * 8/1971 | Roberts | ....................... 373/102 |
| 3,767,832 A | 10/1973 | Bennett | |
| 3,987,359 A | 10/1976 | Thompson | |
| 4,104,576 A | 8/1978 | Frank | |
| 4,607,374 A | 8/1986 | Inagaki et al. | |
| 5,115,447 A | * 5/1992 | Bowman | ...................... 373/102 |
| 5,155,740 A | * 10/1992 | Ao et al. | ..................... 373/108 |
| 5,239,554 A | 8/1993 | Gensini et al. | ............ 373/102 |
| 5,255,285 A | * 10/1993 | Aberl et al. | ................ 373/105 |
| 5,438,588 A | 8/1995 | Wanner | |
| 5,463,653 A | 10/1995 | Du Parc et al. | |
| 5,677,925 A | * 10/1997 | Du Parc et al. | ............ 373/104 |
| 5,991,327 A | 11/1999 | Kojori | ......................... 373/104 |
| 6,226,313 B1 | 5/2001 | Thamodharan et al. | |
| 6,274,851 B1 | 8/2001 | Mulcahy et al. | |

FOREIGN PATENT DOCUMENTS

| | | |
|---|---|---|
| EP | 0033842 | 8/1981 |
| EP | 0429774 | 6/1991 |
| EP | 0589544 | 3/1994 |

* cited by examiner

Primary Examiner—Tu Ba Hoang
(74) Attorney, Agent, or Firm—Ridout & Maybee LLP (57) ABSTRACT

A power control system for an AC electric arc furnace. The control system includes variable reactors located intermediate a furnace power supply and arc electrodes that are height adjustable. The control system monitors operating characteristics of the furnace that are indicative of the active power consumption of the furnace and adjusts the variable reactors and the electrode height so as to minimize variations in the active power consumption. Loss of electrode arc can be predicted and countered by lowering the electrodes and decreasing the reactance of the variable reactors.

29 Claims, 4 Drawing Sheets

POWER CONTROL SYSTEM FOR AC ELECTRIC ARC FURNACE

BACKGROUND OF INVENTION

This invention relates in general to electric arc furnaces and in particular to an apparatus and method for power control in such a furnace.

Alternating current (AC) electric arc furnaces are commonly used to melt or smelt solid materials, such as metals or ore bearing materials. Such furnaces generally use high power arcs to generate heat energy in a refractory lined vessel, and include a power supply for controlling the electrical energy supplied to the arc. High power arcs are an energy conversion mechanism that behave as a non-linear time-varying impedance. Consequently, the voltage, current and power drawn by an arc furnace tends to fluctuate, causing disturbances to both the melting/smelting process and to the supply network. These disturbances can result in inefficiencies, increased equipment wear, and in extreme cases damage to the supply network or arc furnace.

Various attempts have been made to regulate arc furnace power supplies. For example, in some arc furnaces a fixed series reactor has been used to deliver modest improvements in arc stability. Static Watt Compensators (SWC), consisting of a shunt connected thyristor switched resistor bank, have been used to mitigate load rejections. Electrode regulators, which control arc electrode movement, have been used to regulate the relative position of the arc electrodes in order to maintain a set point electrode voltage, current or impedance.

Some control systems have been directed primarily towards stabilizing voltage in an arc furnace. For example, a Static VAR Compensator (SVC) consists of a shunt connected harmonic filter bank and a shunt connected thyristor-controlled reactor, which operate in concert to lower voltage flicker or maintain a constant furnace power factor. The SVC operates by shunt injection of either capacitive or inductive reactive power, thereby maintaining a constant voltage by maintaining the total reactive power draw (MVAR) of the furnace balanced near zero (ie. neither inductive or capacitive).

Other control systems have been primarily directed towards stabilizing current in an arc furnace. For example, U.S. Pat. No. 5,239,554 issued Aug. 24, 1993, to Gensini et al. discloses regulating arc current through the use of controlled series reactances, consisting of a series connected saturable reactor, or a series connected thyristor switched reactor. U.S. Pat. No. 5,991,327 issued Nov. 23, 1999, to Kojori discloses a controller that uses predictive software to gate a thyristor assembly installed in series with the arc in order to supress current swings which cause voltage flicker.

As power is the product of voltage and current ($P = V_{rms} * I_{rms} *$ Power Factor), arc furnace power supplies that operate to stabilize either current or voltage permit the power draw of the arc furnace to fluctuate extensively. In larger furnaces, the active power draw can change by tens of Mega Watts (MW) within short time spans. In many industrial sites in the world, islanded power stations (isolated from a utility grid) supply power to relatively large arc furnaces. Furnace power fluctuations can result in frequency/speed fluctuations in rotating generating equipment, which, for example, may be steam turbines, diesel powered pistons, or water driven turbines. The power generating equipment has upper and lower limits to the frequency fluctuations that can be absorbed without resulting in mechanical damage. Beyond such limits, mechanical and electrical damage can occur. Furthermore, even if immediate damage does not occur, ongoing power and frequency fluctuations cause increased wear and tear on the generating station. To date, these frequency swings have been compensated for by installing bypass valves for water or steam release at the generating station (in the case of hydro or steam turbines), adding additional rotating inertia to dampen the frequency swings, and oversizing the generating station. Such solutions tend to be expensive and inefficient.

Stable constant power in an electric furnace provides for an accurate balancing of power to feed material, which in turn maximizes the energy efficiency of the furnace through efficient heat transfer thus facilitating a high furnace throughput level. Accordingly, there is a need for an efficient, cost effective power control system for use in arc furnaces. There is also a need for a power control system which reduces the magnitude and frequency of power fluctuations in an arc furnace.

SUMMARY OF THE INVENTION

According to the present invention, a power supply control system for an electric arc furnace uses variable reactor control and electrode height regulation to regulate the power used in an arc furnace so as to reduce active power fluctuations. In general, the arc furnace control system of the present invention operates by selecting a furnace transformer voltage tap to match a furnace power set-point, continuously adjusting variable reactors to regulate power swings on a cycle by cycle basis to counter changes in electrode impedance, and mitigating power dips and rises by predictive electrode height regulation.

According to one aspect of the invention, there is provided a power control system for an AC electric arc furnace having an AC power source for applying power to an arc electrode, in which the power control system includes a variable reactance intermediate the power source and the electrode, and a variable reactor controller for monitoring an impedance of the electrode and causing the variable reactance to vary in response to changes in the monitored electrode impedance so as to reduce variations in the active power provided to the electrode. Preferably, the power control system includes an electrode movement device for adjusting the electrode height, and an electrode position controller configured to predict the possible onset of loss of arc for the electrode. If loss of arc is predicted, the electrode position controller causes the electrode movement device to rapidly lower the electrode and the variable reactor controller to momentarily reduce the magnitude of the variable reactance.

According to another aspect of the invention, there is provided a power control system for an AC electric arc furnace having an AC power source for applying power to an arc electrode, including an arc electrode movement device for adjusting the height of the electrode to control the arc length thereof, and an electrode position controller for controlling the operation of the electrode movement device, the position controller being configured to monitor operating characteristics of the arc furnace to predict the onset of a plurality of upset conditions and cause the electrode height to be adjusted in response to a specific predicted upset condition.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described by way of example only and with reference to the accompanying drawings of which.

DESCRIPTION OF THE PREFERRED EMBODIMENTS

Figure 1:
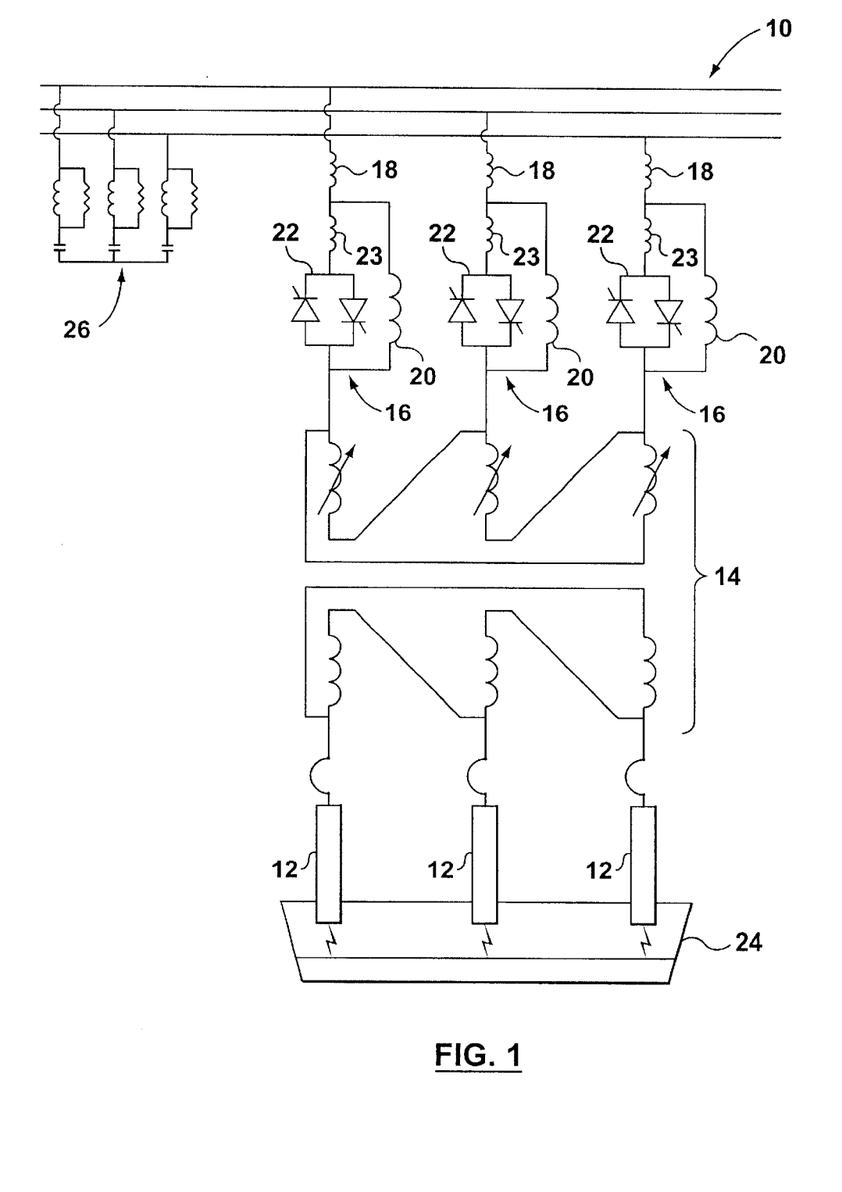
FIG. 1 is a schematic of a three electrode electric arc furnace having a power supply in accordance with an embodiment of the present invention.

With reference to FIG. 1, an exemplary three electrode AC electric arc furnace is shown. Three phase power is provided to the furnace via a local supply bus 10. The supply bus 10 is connected to receive power from a local generating station, or alternatively could be connected to a utility power supply. The furnace includes three electrodes 12, with each electrode being associated with one of the three power phases. The electrodes 12 are connected to the furnace side (secondary windings) of a tapped furnace transformer 14. A series combination of a variable reactor 16 and a fixed reactor 18 connect each phase of the supply side (primary windings) of the furnace transformer 14 to a corresponding line of the supply bus 10. In the illustrated embodiment, each variable reactor 16 includes an inductor 20 connected in parallel with a series combination of an inductor 23 and a thyristor switch 22. Each thyristor switch 22 preferably includes a pair of thyristors arranged in opposite polarity to each other. The arcing ends of electrodes 12 are positioned in furnace vessel 24 to melt or smelt a work material. Preferably, the electrodes 12 are mounted such that their height can be adjusted. As known in the art, a harmonic filter bank 26 is connected to supply bus 10 to remove harmonic distortions that occur as a result of the arcing process and thyristor switching operation. The terms reactor and inductor are used interchangeably herein. The same reference numbers are used to refer to like components throughout the figures.

Arc furnaces require an efficient transfer of electrical arc energy to be used for either melting (ferrous materials) or smelting (non-ferrous materials). This is achieved in a furnace by balancing the material feed pattern or feed rate to the arc power. The better the balance, the better the energy efficiency through lower power losses, as the majority of energy is put into melting or smelting. Arc furnaces generally require an operator or supervisory computer to enter a desired power set-point value to match the material feed rate. In conventional arc furnaces using existing control methods actual power consumption can fluctuate extensively about the desired power set-point. The power supply of the present invention functions to stabilize active power used by the arc furnace in order to improve the balance of arc power to the material feed rate, or in the case of a batch process, to ensure maximum heat transfer from the arc to the charge material.

Figure 2:
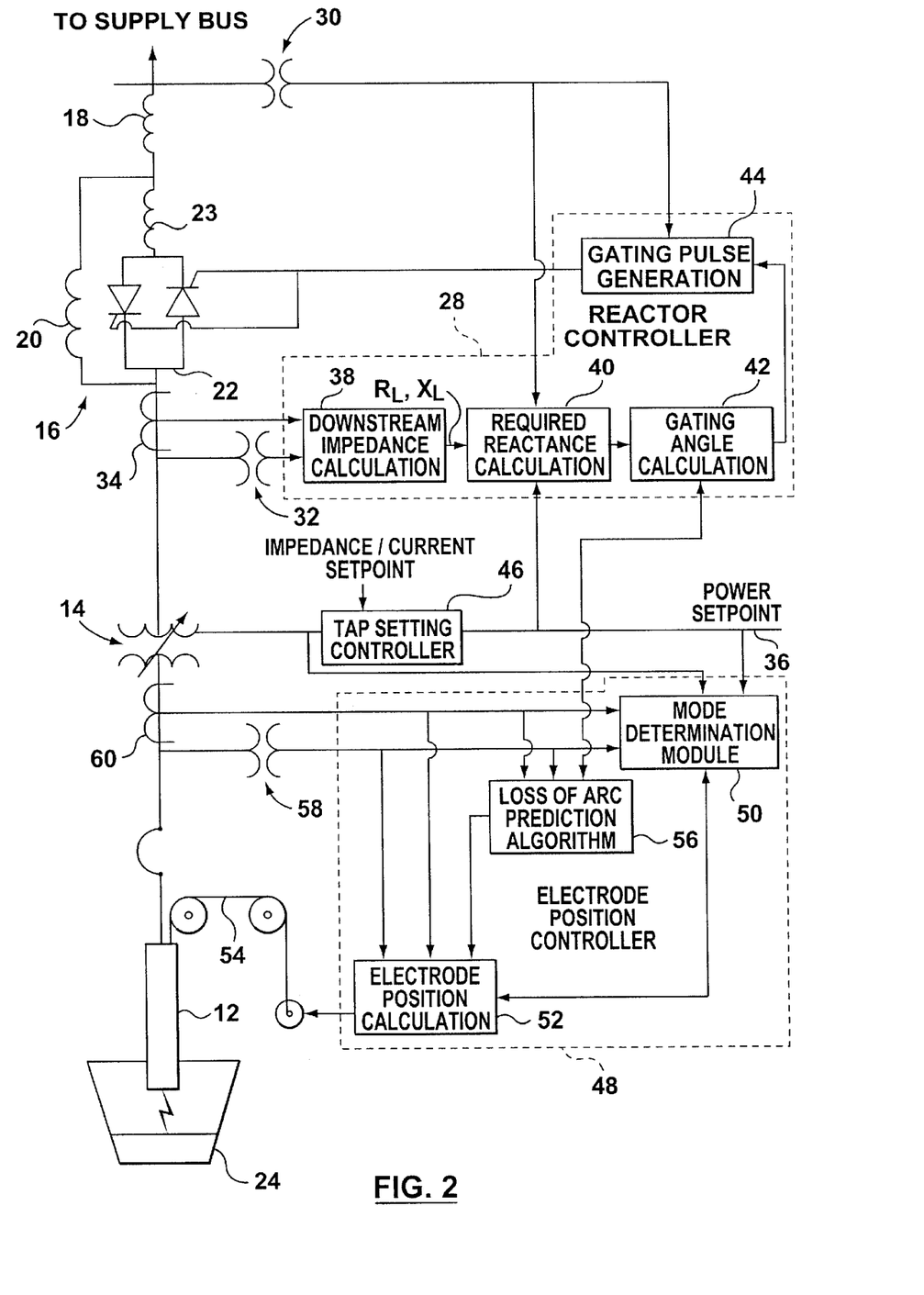
FIG. 2 is a block diagram of a power control system for the power supply of the arc furnace of FIG. 1.

With reference to FIG. 2, a power supply control system for the arc furnace is shown in respect of a single electrode 12. The control system of the present invention preferably controls three aspects of the arc furnace, namely the value of variable reactors 16, the tap locations of transformer 14, and the height adjustment of electrodes 12.

Turning firstly to control of the tap locations of the furnace transformer 14, the power supply control system preferably includes a tap setting controller 46 for setting the tap locations based on an inputted desired power set-point. In particular, the tap locations are set so that, based on predetermined characteristics of the arc furnace, an appropriate voltage will be provided to the electrodes to roughly match actual power consumption to the power set-point. In operation, the tap setting controller 46 preferably performs the following steps:

(a) calculates a required operating voltage;

(b) calculates an appropriate transformer voltage tap based on the predetermined (ie. nameplate) voltage values associated with each tap; and (c) moves the transformer tap to the calculated tap (either on-load or off-load).

The tap setting controller 46 can include a checking routine to ensure that excessive tap changer movements do not occur. Typically, the tap setting controller will also require input of a desired electrode current or a desired electrode impedance in order to determine the required operating voltage. In the case of a three electrode arc furnace, the operating voltage can be determined according to the following equations when a desired electrode current has been provided in addition to a desired power set-point:

$$A = I^2 X_p^2 / (V_p^4)$$

$$B = 2I^2 X_p X_3 / (V_p^2) - 1$$

$$C = P^2/(9I^2) + I^2 X_s^2$$

$$V = \frac{-B \pm \sqrt{B^2 - 4AC}}{2A} \quad \text{Equation (1)}$$

Where:

V=required operating voltage (furnace transformer secondary line to line voltage)

I=desired electrode current (furnace transformer secondary phase current)

$X_p$=total primary reactance from the furnace transformer to an infinite bus, including the furnace transformer reactance $X_s$=total secondary reactance of system from the furnace transformer to the molten bath in the furnace vessel P=desired power set-point $V_p$=nominal primary line to line voltage In the event that a desired electrode impedance Z is provided instead of electrode current I, then, in the case of a three electrode furnace, electrode current I can be determined as follows:

$$I = \sqrt{\frac{P}{3\sqrt{Z^2 - X_s^2}}},$$

and then equation (1) used to determine the required operating voltage.

In the illustrated embodiment, the tap setting controller 46 operates simultaneously on all three phases of the transformer 14 when it receives a new desired power set-point or a new desired electrode current or impedance. The desired power set-point will typically be an operator or supervisory computer entered value, and will be changed by the operator or supervisory computer throughout a production run as required by the flow rate of material to and through the furnace. The better balanced that actual power consumption is to desired the power set-point, the less operator or supervisory computer tweaking of the power-set point will generally be required.

Turning now to the control of the variable reactors, as indicated in FIG. 2, the variable reactor control system preferably includes, for each of the three phases, a first voltage transformer 30 for measuring the voltage on the supply side of the variable reactor 16, a second voltage transformer 32 for measuring the voltage on the furnace side of the variable reactor, a current transformer 34 for measuring the main current flowing to the transformer 14, and a reactor controller 28. The reactor controller 28 receives information from the first and second voltage transformers 30, 32, the current transformer 34, and a desired power set-point line 36, and controls the variable reactor 16 based on calculations done on such information. In the present embodiment, each of the three variable reactors are controlled largely independent of each other in that the functions of reactor controller 28 described herein are performed separately for each phase. A description of the control of one of the three variable reactors 16 by the reactor controller 28 follows. The variable reactors associated with the other two phases are controlled in a similar manner.

The reactor controller 28 controls the reactance of variable reactor 16 by adjusting the firing angles of thyristors 22, thereby increasing or decreasing the current through the inductor 20. Based on ongoing current and voltage readings acquired from the first and second voltage transformers 30, 32 and the current transformer 34, the reactor controller 28 gates the thyristors to vary reactance in order to regulate power swings in the arc furnace about the desired power set-point in the presence of arc impedance fluctuations. Preferably, the thyristor gating is periodically adjusted at least once during each AC line voltage half cycle. As indicated in FIG. 2, the reactor controller 28 includes a downstream impedance calculation module 38 that determines the impedance downstream (ie. on the furnace side) of the variable reactor 16. In particular, the impedance calculation module 38 receives, from current transformer 34, an input that is representative of the primary current through the supply side of the furnace transformer 14, and from the voltage transformer 32 an input that is representative of the voltage waveform on the furnace side of the variable reactor. Based on these current and voltage measurements, the impedance calculation module 38 determines the resistance ($R_I$) and reactance ($X_L$) at the furnace side of the variable reactor, and outputs these values to a required reactance calculation module 40. Variations in the furnace side resistance ($R_I$) and reactance ($X_L$) are indicative of the variations in electrode impedance that occur during the smelting or melting process. The reactance calculation module 40 also receives as inputs a signal from the voltage transformer 30 that is representative of the voltage (V) at the supply side of the variable reactor 16, and a desired per phase power set-point ($P_O$) that is derived from a set-point input line 36. The reactance calculation module 40 determines, based on these inputs, a required reactance ($X_{REQ}$) value that the variable reactor should assume in order for the actual furnace power to track the desired furnace power set-point. In the illustrated embodiment, the required reactance needed to maintain the power set-point ($P_O$) in the presence of arc resistance fluctuations is calculated in accordance with the following equation:

$$X_{REQ} = \left( \sqrt{\frac{R_L V^2}{P_O} - R_L^2} \right) - X_L \qquad \text{Equation (2)}$$

Figure 3:
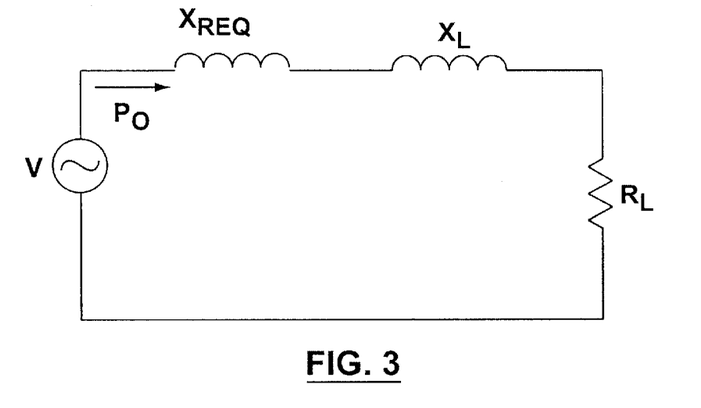
FIG. 3 is a schematic circuit model of one phase of the arc furnace at fundamental frequency.

Equation (2) is based on a simplified per phase circuit representation of the arc furnace as shown in FIG. 3. In practice, the circuit model upon which the required reactance calculation is based will depend upon the unique configuration and characteristics of the subject arc furnace.

The reactor controller 28 also includes a gating angle calculation module 42 which receives three inputs, namely the required reactance ($X_{REQ}$) as calculated by the reactance module 40, and the reactance ($X_L$) and resistance ($R_L$) at the furnace side of the variable reactor 16 as determined by the downstream impedance calculation module 38. Based on these inputs, the angle calculation module 42 determines the appropriate firing angle for thyristors 22 required to achieve the calculated required reactance. In a preferred embodiment, the module 42 determines the firing angles by accessing a stored look-up table that has been predetermined in accordance with the unique characteristics of the subject arc furnace. In the illustrated embodiment, the look-up table values can be predetermined by performing the following steps:

a) Determine possible values for the furnace side reactance ($X_L$) and resistance ($R_L$), in predetermined increments;

b) Based on design values for the shunt inductor 20 and the system line voltage, calculate a steady-state load current waveform for each thyristor gating angle between 0 to 180 degrees, for each of the possible values for the furnace side reactance ($X_L$) and resistance ($R_L$);

c) For each steady-state load current, calculate the current fundamental frequency component, and calculate the total fundamental reactance by taking the ratio of system line voltage to the fundamental current;

d) For each calculated total fundamental reactance, determine a required reactance value ($X_{REQ}$) of the variable reactor by subtracting the furnace side reactance ($X_L$) from the total fundamental reactance; and e) Tabulate the results such that the required gating angle can be determined for each possible combination of required reactance values ($X_{REQ}$), furnace side reactance ($X_L$) and furnace side resistance ($R_L$).

It will be appreciated that the gating angles could be calculated at the gating angle calculation module 42 using methods other than referencing a predetermined look-up table, however given the compute intensive and repetitive nature of the gating angle calculations, a look-up table offers a reasonably efficient solution. Additionally, other methods could be used for calculating the values that are to be included in the look-up table, and other variables could be taken into consideration depending on the specific configuration of the subject arc furnace.

The reactor controller 28 also includes a gating pulse generation module 44 which receives as inputs the gating angle as determined by the angle calculation module 42, and a line voltage signal from voltage transformer 30. The pulse generating module 44 includes a pulse gate generator that adjusts the gating angles of thyristors 22 to match the gating angle determined by the angle calculation module 42. In the illustrated embodiment, the pulse generating module is configured to update the thyristor angle every half AC voltage cycle, and in this respect includes a zero-crossing detector that monitors the line voltage via voltage transformer 30 in order to control the timing of thyristor angle updates. Similarly, in this embodiment the required reactance calculation module 40 determines a required reactance value at least every half AC line voltage cycle to ensure that the gating angle provided to the pulse generation module 44 is current. Depending on furnace specific characteristics, the reactor controller 28 could be configured to adjust the firing angles with greater or less frequency than once per half cycle, although typically adjustments at least once per power cycle are desirable in order to sufficiently stabilize arc power.

As will be explained in greater detail below, the reactor controller 28 is preferably configured to accept an override signal causing it to turn fully on the thyristor pair 22 when the power supply control system detects that loss of electrode arc is impending. In the illustrated embodiment, the gating angle calculation module 42 is configured to output, for a predetermined interval, a near zero gating angle instruction to the gating pulse generation module 44 when the gating angle calculation receives an override signal from a loss of arc prediction module 56. The override signal from the loss of arc prediction module 56 takes precedence over any inputs that the gating angle calculation module 42 receives from the required reactance calculation module 40.

The modules 38, 40 and 42 of the reactor controller 28 can conveniently be implemented using a suitably programmed industrial PC, however it will be understood by those skilled in the art that the functionality of such modules could be implemented using a number of different possible hardware and/or software configurations. The gating pulse generation module 44 can conveniently be implemented using a suitable programmed FPGA device, however other implementations could be used such as micropresssor or dedicated circuit based devices.

The presence of the fixed reactor 18 in series with the variable reactor 16 helps maintain the average furnace power factor within a specific range as measured at the voltage supply bus, especially in a situation where the reactance 20 is completely shorted. With the fixed reactor 18 in place, a variation in arc resistance can be compensated for by the changing the reactance of the variable reactor 16 by a magnitude that is equal to or less than that of the arc resistance variation. Under these conditions, the resulting reactive power draw from the supply bus is minimized. The inductor 23 serves to protect the thyristor pair 22 from damaging short circuit currents.

Turning now to regulation of the electrode positions, the power supply control system includes an electrode position controller 48 for regulating an electrode movement system 54 to adjust the height of the electrodes 12 relative to the furnace vessel 24. As will be described in greater detail below, the electrode position controller 48 is configured to monitor on an on going basis various furnace operating conditions, such as electrode voltages, electrode currents, power consumption, and electrode movements. The monitored process variables, and changes in the monitored process variables, are compared against stored values and variation patterns that have been predetermined to be indicative of a number of different types of furnace upset conditions. Based on characteristic signatures in the variations of the furnace process variables, the position controller predicts the onset of one of a number of different possible furnace upset conditions, and regulates the electrode height in a mode that is appropriate for the specific upset condition.

Through upset condition specific regulation, the electrode position controller attempts to reduce power swings while also maintaining process energy efficiency, furnace roof structural integrity and power system electrical balance. In the embodiment shown in FIG. 2, the electrode movement system 54 is illustrated as a winch-driven system, however other systems capable of raising and lowering the electrodes 12, such as hydraulic cylinder driven systems, could alternatively be used.

The electrode position controller 48 preferably includes a mode determination module 50 that continuously monitors the operating characteristics of the furnace and picks one of a number of different possible operating modes for electrode height regulation based on the measured characteristics. In order to measure furnace conditions, the mode determination module 50 receives inputs from a current transformer 60, which measures electrode current, and a voltage transformer 58, which measures electrode voltage to neutral. The mode determination module 50 also monitors additional operating characteristics, including the furnace roof temperature via signals received from a temperature sensing element such as a thermocouple (not shown), furnace noise (including audible and some inaudible frequencies) and via signals received from an acoustic transducer (not shown), electrode movement via feedback from an electrode position calculation module 52, the desired power set-point via line 36, and the furnace tap setting via an input from the tap setting controller 46. The mode determination module 50 is configured to, upon detecting the onset of upset conditions in the furnace operating characteristics, automatically select from among a VOLTAGE mode, an IMPEDANCE mode and a CURRENT mode of operation.

The mode determination module 50 selects VOLTAGE mode when the onset of an open arc situation (for example, when one or more electrode tips are positioned unshielded above the work material) is detected in order to protect the furnace roof from excessive arc radiation. The mode determination module 50 monitors a number of variables in order to determine if an open arc situation has occurred or is likely to occur, including but not necessarily limited to: (a) changes in electrode power factor; (b) increases in standard deviation of electrode power; (c) higher incidences of loss of arc for the electrode; (d) higher audible furnace noise; (e) changes in the arc current and voltage harmonic profiles; (f) increase in furnace roof heat flux immediately surrounding the electrode opening; and (g) recent electrode movements such as raise and lower hunting of the electrode. The mode determination module 50 compares the ongoing monitored values of these variables against stored thresholds and patterns that have been predetermined to be indicative of the onset of an open arc situation in the subject arc furnace.

Upon selecting VOLTAGE mode, the mode determination module 50 determines a voltage mode control error (Control Error) equation that it provides to the electrode position calculation module 52 to control movement of the electrodes 12, typically in a downward direction to eliminate the open arc condition. In a preferred embodiment, the voltage mode Control Error equation is as follows:

$$\text{Control Error} = kI*I - kV*V \qquad \text{Equation (3)}$$

where:
  V is the electrode to neutral voltage as measured through transformer 58;
  kI and kV are current and voltage scaling constants that are pre-calculated and stored in a look-up table. They are indexed in the look up table according to the transformer tap position; and I is a predetermined constant that approximates what a normal operating electrode current for the subject arc furnace is.

In VOLTAGE mode, the Control Error equation is applied in respect of all three electrodes 12 using the voltage that is measured for each respective electrode. By using a predetermined current constant for I, rather than a measured electrode current value, to determine the control error the electrode position controller focuses on quickly stabilizing arc voltage through electrode height regulation.

The default mode that is selected by the mode determination module 50 is IMPEDANCE mode. IMPEDANCE mode is used when the furnace maintains covered or shielded arcs (ie. during normal operation, where the cover will be provided by the work product located in the furnace, for example scrap steel, foamy slag, or ore bearing materials). In IMPEDANCE mode, the mechanical movement of each electrode 12 is decoupled from that of the other electrodes in the three electrode system of the present embodiment. Each individual electrode 12 is moved when its measured impedance value changes by a predetermined amount from a set-point impedance value until a match between the measured value and the set-point value is restored within a predetermined tolerance. Thus, for each electrode, the mode determination module 50 determines the ongoing electrode impedance (through the measured electrode voltage and current values), and if the measured impedance does not match the set-point impedance (ie. if an upset condition exists for that electrode), the mode determination module 50 calculates an impedance mode Control Error equation that it provides to the electrode position calculation module to control electrode movement. Preferably, the impedance set-point value is the ratio of the gain constants kI/kV, and the impedance mode Control Error equation is as follows:

$$\text{Control Error} = kI^*I - kV^*V \qquad \text{Equation (4)}$$

where:

V is the electrode to neutral voltage as measured through transformer 58;

kI and kV are the gain constants mentioned above; and

I is the electrode current as measured through transformer 60.

In IMPEDANCE mode, the individual adjustment of electrodes whose process impedance has changed from a set-point impedance value reduces the disturbance of the charge cover over the arc. It will be appreciated that rather than being measured by secondary side transformers 58, 60, values for V and I could be derived from measurements taken from primary side transformers 32 and 34, respectively, by adjusting such primary side measurements in accordance with the appropriate furnace transformer turns ratio.

The mode determination module 50 can also select a CURRENT mode when the furnace operating conditions indicate a high degree of electrical unbalance (which, if left unanswered can cause a protective relay to trip the furnace power off). In CURRENT mode, the electrode position controller 48 operates to move the electrodes to restore balanced electrode currents, which minimnizes the possibility of an unbalanced furnace trip. The mode determination module 50 monitors the current balance by measuring the component of negative sequence current in the primary or secondary phase currents of the furnace transformer 14. In the illustrated example, the secondary phase currents are measured through current transformers 60, and the mode determination module 50 performs symmetrical component decomposition. An exemplary decomposition equation is illustrated as follows:

$$I_2 = \tfrac{1}{3}(Ia + a^2 Ib + aIc)$$

where:

a = −0.5 + j0.866;

$I_2$ = negative sequence current;

Ia = phase a current vector;

Ib = phase b current vector; and

Ic = phase c current vector.

When the value of negative sequence current is maintained for a predetermined time above a threshold level, CURRENT mode is selected. When the current balance condition upset is rectified, IMPEDANCE mode is restored. Upon selecting CURRENT mode, the mode determination module 50 determines a current mode control error equation that it provides to the electrode position calculation module 52 to control movement of the electrodes 12 to reduce the current imbalance. In a preferred embodiment, the current mode Control Error equation is as follows:

$$\text{Control Error} = kI^*I - kV^*V \qquad \text{Equation (5)}$$

where:

I is the electrode current as measured through transformer 60;

kI and kV are current and voltage scaling constants as noted above; and

V is a predetermined constant that approximates what a normal operating electrode voltage for the subject arc furnace is.

In CURRENT mode, the Control Error equation is applied in respect of all three electrodes 12 using the current that is measured for each respective electrode. By using a predetermined voltage constant V, rather than a measured voltage value, to determine the control error the electrode position controller focuses on quickly balancing electrode currents through electrode height regulation. It will be appreciated that the current mode Control Error equation (5) and voltage mode Control Error equation (3) are the same as impedance mode Control Error equation (4), with the replacement of measured voltage V with a constant in the case of the current mode equation, and the replacement of measured current I with a constant in the case of the voltage mode equation.

The coupling of electrode voltages and currents between the phases is inherent in a three electrode arc furnace. Thus, in the three electrode furnace of the present embodiment, when an arc disturbance occurs under one electrode, the voltages and currents of all three electrodes are affected. Hence, in CURRENT and VOLTAGE mode, movement of all three electrodes occurs to counter an upset condition. In IMPEDANCE mode, however, only the electrode whose impedance needs adjusting is moved, which minimizes disturbance of the arc cover.

The electrode position controller 48 includes an electrode position calculation module 52 that is configured to control the electrode movement system 54 to raise or lower electrodes 12 in accordance with instructions received from the mode determination module 50. The calculation module 52 also monitors electrode position for its own use and to provide feedback about electrode location and movement to the mode determination module 50. As indicated above, in CURRENT and VOLTAGE mode, the three electrodes are moved to restore current and voltage, respectively, to set-point values. In IMPEDANCE mode, movement is individually imparted to the electrodes to restore their respective impedances to correct levels. The calculation module 52 receives electrode current information and electrode voltage information from current transformer 60 and voltage transformer 58, respectively.

During furnace operation, the position calculation module 52 receives the appropriate Control Error equation selection from the mode determination module 50 and uses it to control electrode movement as follows. The Control Error is raised to the exponent n, where alpha<n<beta (where alpha is usually=1, and beta is usually=2), and continuously integrated by an integrator. When the integral limit is reached, the electrode start speed is set to a value proportional to the average error over the integration period. The electrode speed is then made proportional to the instantaneous error until the error falls within a predetermined deadband. The integrator is then re-set, and integration starts when the electrode stops moving. In the event that the Control Error is higher than a pre-set threshold, the integration step is bypassed, and the electrode is moved at a high speed or at maximum speed until either (a) the error falls within the predetermined deadband, or (b) the error falls below the pre-set threshold and the speed is then adjusted to be proportional to the instantaneous error. Generally, electrode movement speeds in the present embodiment of the invention would fall between 300 mm/minute to 20,000 mm/minute. It will be appreciated that in addition to the presently described method, a number of different known movement control algorithms could be used by the electrode position calculation module 52 to control electrode movement.

A novel feature of the electrode position calculation module 52 is that it includes an arc length override function whereby it determines the electrode arc length for each electrode prior to moving it, and continuously monitors electrode travel while moving the electrodes. If an electrode travels past its calculated arc length, an override command is issued to reduce the electrode speed to creep speed to minimize electrode breakage or an undesirable metallurgical reaction in the slag bath of the furnace (which can result from a reaction between the carbon in the electrode and the molten bath within the furnace). In the present embodiment, the arc length for each electrode is calculated as follows:

$$\text{Arc Length} = (V - I * R_{slaq} - V_o)/E_o$$

where:

V is the electrode to neutral voltage;

I is electrode current;

$R_{slaq}$ is the resistance of the electrode when the tip just contacts the hot bath surface;

$V_o$ is a constant representing a voltage drop; and $E_o$ is a constant which represents the arc electric field in volts/cm.

In practice, the arc length calculation could be dependent on other furnace operating variables in addition to those shown above. In the present embodiment, the Control Error is integrated every half power cycle, based on furnace operating characteristics measured every half cycle. However, less frequent integration and sampling intervals could be used by the electrode height regulator of the present invention.

The electrode position controller 48 also includes a further override function that is implemented by the loss of arc prediction algorithm module 56, which predicts yet a further type of upset condition. This module predicts the loss of arc in any of the electrodes 12, by monitoring for the onset of a characteristic rapid decay of arc current, and responds by (a) instructing the electrode position calculation module 52 to rapidly lower the electrode 12 for which loss of arc is predicted, and (b) as noted above, sending an override signal to the reactor controller 28 that results in full turning on of the thyristor switch 22 (ie. providing a gating angle of nearly zero) that is associated with the electrode 12 for which loss of arc is predicted, thus completely shunting the respective inductor 20, which provides an instantaneous voltage boost to the affected electrode. The increase in the electrode tip voltage caused by having the thyristor switch fully on and the reduction in arc length due to lowered electrodes will increase the electric field under the electrode. As a result the level of ionization in the arc column will be restored and a loss of arc is prevented (or the arc restored in the event that loss of arc has actually occurred). Once the arc column is restored the override control of the reactor controller 28 by loss of arc prediction module 50 will be terminated, thus permitting the reactor controller 28 to detect the resulting reduced arc impedance and accordingly increase the reactance of variable reactor 16 by increasing the thyristor gating angle. As a result, the electrode power will not be allowed to exceed the power set point value. The traditional consequence of a fast electrode lower has been a rapid positive current and/or power swing which can result in a circuit breaker trip on smelting furnaces. On steel furnaces, a fast lower can cause electrode tip breakage and/or a circuit breaker trip. Thus, rapid electrode lowers have traditionally been avoided. However, in the present invention, the control of variable reactors 16 in conjunction with the electrode lowering mitigates the positive power swing, thereby reducing the possibility of a power outage due to a breaker trip. Furthermore, the arc length override function (which continues to run even during a loss of arc override) reduces the chance of furnace delay due to an electrode tip breakage.

The operation of the loss of arc prediction algorithm module 56 is illustrated by the following pseudo-code:

(i) DO WHILE the furnace is operating (ii) Continuously sample each electrode current;

(iii) IF the rate of change of decreasing current is greater than a preset limit,
AND IF the electrode current is less than k×(the set point value)

(iv) THEN initiate a master lower at full speed and gate thyristors;

(v) IF the electrode current is restored to set point value OR IF the electrode voltage is zero (vi) THEN restore electrode regulation to mode determination module 50 and thyristor regulation to reactor controller 28;

(vii) END DO;

As indicated in steps (i) and (ii) of the pseudo-code, while the arc furnace is operating, the loss of arc prediction algorithm module 56 monitors each electrode current via the current transformers 60 that are associated with each electrode. As indicated in step (iii), if the current is decreasing, its rate of change is checked to see if it exceeds a predetermined threshold value. The predetermined threshold is chosen based on the characteristics of the subject furnace, and in particular is chosen to be a value that is known to be indicative of impending loss of arc. In step (iii), the electrode current is also checked to see if it is less than a predetermined percentage of a current set-point. (The current set-point being determined based on the power set-point and transformer voltage tap setting.) If the two test conditions in step (iii) exist, the module 56 concludes, as per step (iv), that the furnace operating conditions are predictive of an impeding loss of arc and takes steps to avoid loss of arc by instructing the electrode position calculation module 52 to lower the electrodes, and the reactor controller 28 to fully turn on thyristors 22. As indicated in step (v) these arc loss avoidance measures are maintained until (a) the subject electrode current is restored to set-point value (which is indicative of a loss of arc being prevented, or an arc being restored in the event that loss of arc did occur), or (b) the electrode voltage goes to zero (which is indicative of the electrode tip touching the molten bath in the furnace vessel). After step (v) the loss of arc prediction module 56 releases control of electrode regulation back to the mode determination module 50, and control of the variable reactors 16 back to the reactor controller 28, as per step (vi), which will generally result in some raising of the electrodes and an increase in variable reactance 16, thus mitigating any positive power swing that could occur on arc re-ignition.

The electrode position controller 28 can conveniently be implemented using a suitably programmed industrial PC, however it will be understood by those skilled in the art that the functionality of its modules could be implemented using a number of different possible hardware and/or software configurations. The tap setting controller 46 could also be implemented using an industrial PC or suitable alternative, and could be implemented using the same PC as is used for the electrode position controller 48.

The variable reactor control and electrode regulation of the present invention assist in providing the arc furnace to which they are applied with a flat line power profile without substantial positive or negative power fluctuations. The fast electronic thyristor control enhances the slower power stabilizing mechanical action of the electrode regulator. Electronic thyristor control provides fast response to arc fluctuations, with electrode regulation providing ongoing response to mechanical disturbances (for example, work material collapse, loss of arc, etc.). In general, the arc furnace control system of the present invention functions to:

Select the required furnace transformer voltage tap to match the furnace power set-point.

Continuously adjust variable reactors to regulate power swings on a half cycle or cycle by cycle basis to counter changes in electrode impedance; and Mitigate power dips by predictive electrode regulation resulting in fast electrode lowers, which will prevent electrode arcs from going out, and controlling a positive power swing on arc re-ignition with thyristor control and a simultaneous electrode raise.

Figure 4:
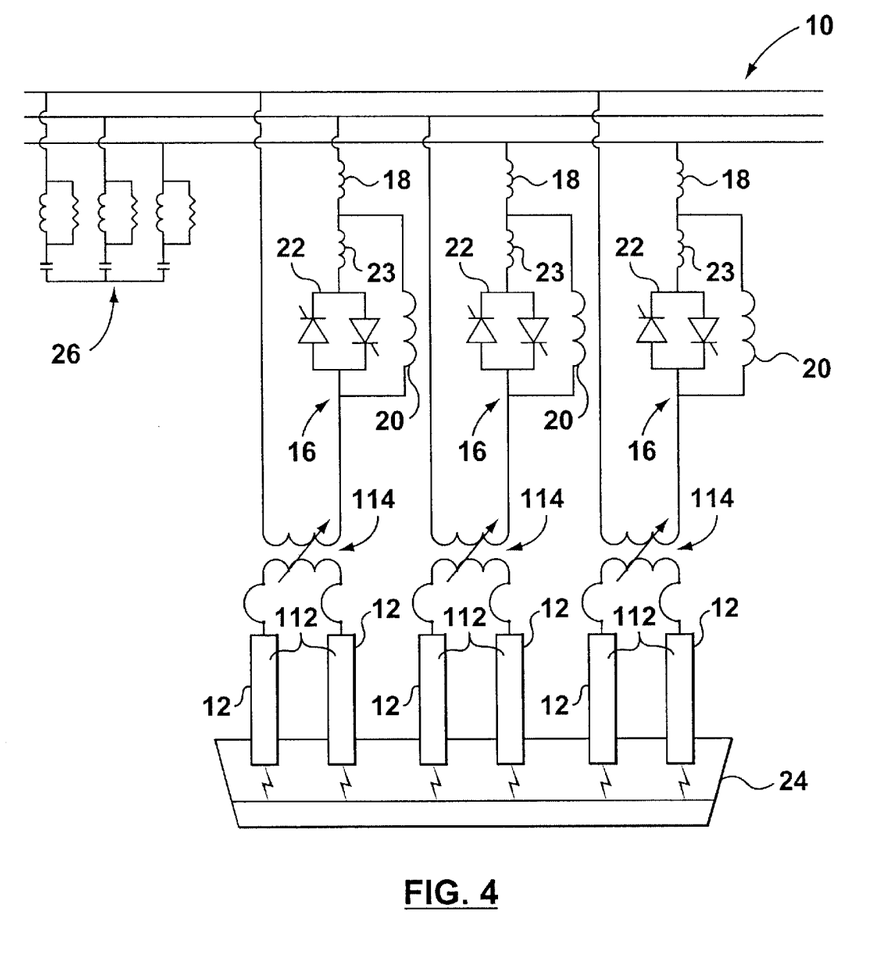
FIG. 4 is a schematic of a six electrode electric arc furnace having a power supply in accordance with another embodiment of the invention.

In the illustrated embodiment, a three electrode furnace has been described in which the variable reactors 16 are located outside the delta enclosure of the furnace transformer. It will be understood that the control system of the present invention could also be used adapted for other arc furnace configurations. For example, with appropriate modification the control system could be used to deliver similar benefits in furnace in which multiple electrodes were associated with each phase, such as a six electrode furnace in which a pair of electrodes 12 is associated with each phase. In this respect, FIG. 4 shows six-electrode furnace in accordance with another embodiment of the present invention. The control system for the six electrode furnace would be similar to that shown in FIG. 2 and described above in respect of the three electrode furnace, with some adaptation as noted below to account for differences between six electrode and three electrode furnaces. A block diagram of the control system for the six electrode furnace is shown in FIG. 5 in respect of an electrode pair 112 associated with a single phase.

Figure 5:
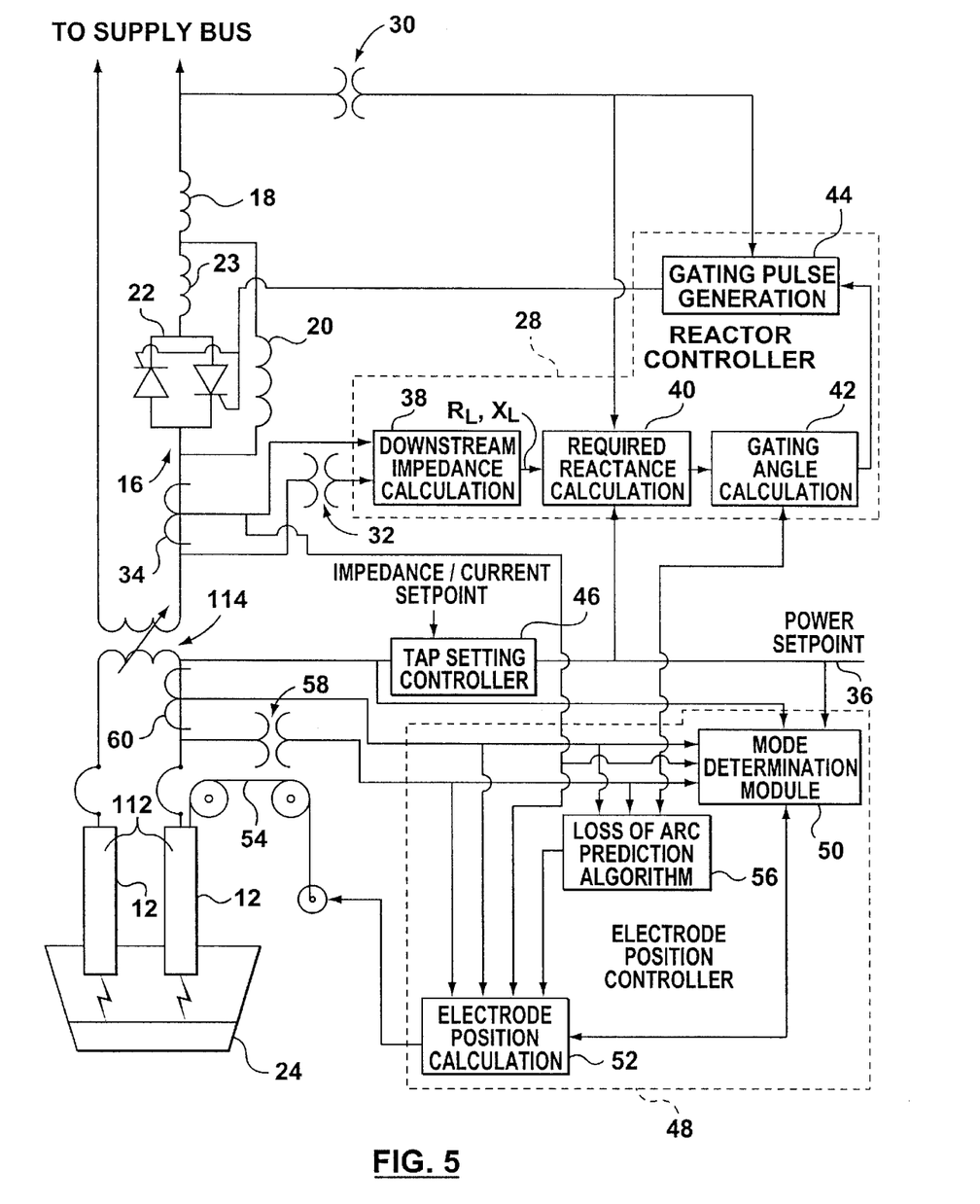
FIG. 5 is a block diagram of a power control system for the power supply of the arc furnace of FIG. 4.

With reference to FIGS. 4 and 5, the six electrode furnace behaves as three-single phase loads (two electrodes 12 each) on the power system. Each electrode pair 112 receives power from a respective single phase furnace transformer 114. A variable reactor 18 is located intermediate the primary winding of each transformer 114 and the power supply bus 10. In a preferred embodiment of a six-electrode furnace, each pair of electrodes can have an individual power set point. There are consequently three power set points which are usually equal but can be set differently according to operating requirements. Each furnace transformer 114 has its tap selected by the tap setting controller 46 according to its respective power set point. The same general principles apply in setting the taps for each of the furnace transformers 114 as noted above in respect of the transformer 14.

With respect to variable reactor control in the six electrode furnace, per phase control is largely the same as that noted above in respect of three phase furnaces, as equation (2) noted above is also applicable for an electrode pair 112 that is associated with a single phase.

With respect to electrode height regulation in the six electrode furnace, each electrode pair 112 is decoupled from the other electrode pairs as each pair is fed from a separate furnace transformer 114. However, for any electrode pair 112, the electrodes of the pair are electrically coupled to each other at they are fed from the same transformer 114 and so the movement of one electrode impacts the current and voltage on the other electrode. The electrode movement device 54 is mechanically capable of moving the two electrodes 12 of a single electrode pair 112 independently.

As in the three electrode furnace, control error calculations are preformed by the electrode position calculation module 52, in accordance with the mode selected by mode determination module 50, in respect of each electrode 12. Thus, six control error calculations are performed, one for each electrode. In IMPEDANCE mode, the gains kI and kV are selected to take into account that the sum of electrode pair voltages is a near constant. In VOLTAGE mode, the gains kI and kV are selected to take into account that the sum of electrode pair voltages is a near constant.

CURRENT mode for a six electrode furnace is modified from that of a three electrode furnace as follows. First of all, electrode pair current imbalances are monitored and corrected for.

Within an electrode pair 112, CURRENT mode is a fast acting mode to rapidly adjust electrode pair currents. It moves both electrodes of a pair simultaneously in the same direction. Similar to a three electrode furnace, CURRENT mode may unbalance the impedances and electrode voltages within an electrode pair. If the arc has not extinguished, but if an electrode pair current has deviated significantly from its average value, CURRENT mode is briefly selected to rapidly bring the current back towards set point. Physically, both electrodes of a pair move for a short time in the same direction.

CURRENT mode also acts to correct imbalances that occur across the different phases.

To minimize the negative sequence current, current mode must operate to balance the primary currents to each of the three single phase transformers. Thus, in a six electrode system, the electrode position controller 48 is connected to receive primary current information from the current transformers 34 of each of the three phases. If the mode determination module 50 determines that the secondary voltage taps on each of the three transformers 114 are not the same, a current balance command will result in a power set point override for the specific transformer 114 with the lower voltage or the higher of the three voltage taps. If there is a large deliberate difference in electrode pair power set points or secondary voltage taps which cause unequal primary currents, CURRENT mode is disabled—meaning that the operator has decided to allow a high degree unbalance.

Although the variable reactor 16 has been shown as a single pair of thyristor switches, it will be appreciated that other configurations could be used for variable reactor 16, such as a multi-stage thyristor switch for example. Alternatively, other types of power semiconductor switches could be used in the place of thyristors.

What is claimed is:

1. A power control system for an AC electric arc furnace having an AC power source for applying active AC power to an arc electrode, comprising:
    a variable reactance intermediate the AC power source and the electrode; and
    a variable reactor controller for monitoring an impedance of the electrode and causing the variable reactance to vary in response to changes in the monitored electrode impedance so as to reduce variations in the active AC power provided to the electrode;
    the variable reactor controller is configured to calculate the electrode impedance, calculate a required reactance based on the calculated electrode impedance, and adjust the variable reactance to the calculated reactance.

2. The power control system of claim 1 wherein the variable reactor controller is configured to periodically determine, in response to the monitored electrode impedance, a reactance value for the variable reactance that will result in a predetermined active power draw by the electrode, and cause the variable reactance to be adjusted to the determined reactance value.

3. The power control system of claim 2 wherein the predetermined active power draw is based on a determination of the amount of power required by the furnace to process a known volume of work material.

4. The power control system of claim 2 wherein the variable reactor controller is configured to determine the reactance value and adjust the variable reactance to match the determined reactance value, at least once every AC power cycle.

5. The power control system of claim 2 wherein the variable reactor controller is configured to determine the reactance value and adjust the variable reactance to match the determined reactance value, at least once every half AC power cycle.

6. The power control system of claim 1 wherein the variable reactance includes a thyristor controlled inductor.

7. The power control system of claim 6 including a fixed reactor intermediate the power source and the electrode.

8. The power control system of claim 1 including:
    an electrode movement device for raising and lowering the electrode to control the length of the arc produced thereby; and
    an automated electrode position controller for controlling the operation of the electrode movement device, the electrode position controller being configure to monitor operating characteristics of the furnace and select from a plurality of different operating modes for controlling movement of the electrode based on the monitored operating characteristics.

9. The power control system of claim 8 wherein the electrode position controller compares the monitored operating characteristics against predetermined values that are indicative of an upset condition in which the electrode is located too far above a work material and causes the electrode height to be adjusted to eliminate the upset condition.

10. The power control system of claim 8 wherein the electrode position controller is configured to periodically calculate the length of the arc produced by the electrode and cause the electrode movement device to reduce the speed of electrode movement to prevent the electrode from travelling beyond the calculated arc length.

11. The power control system of claim 1 including:
    an electrode movement device for adjusting the electrode height;
    an electrode position controller configured to monitor operating characteristics of the furnace and compare the monitored characteristics with predetermined characteristics to predict the possible onset of loss of arc for the electrode, and cause the electrode movement device to rapidly lower the electrode and the variable reactor controller to momentarily reduce the magnitude of the variable reactance to prevent loss of arc.

12. A method for controlling an arc furnace having a three phase AC power source for applying three phase power to three respective arcing electrodes and having variable reactances connected intermediate respective phases of the power source and the three electrodes, comprising the steps of:
    a) monitoring, for each of the three power phases, a respective electrode impedance;
    b) calculating, for each of the three power phases, a required reactance based on the monitored electrode impedance; and
    c) adjusting the inductance of the variable reactances to the required reactance to compensate for variations in the respective electrode impedances so as to reduce fluctuations in an active power drawn from the power source.

13. The method of claim 12 wherein step (c) includes, for each power phase, determining an inductance required to maintain a predetermined active power consumption level taking into account variations in the respective electrode impedance, and adjusting the respective variable reactance accordingly.

14. The method of claim 12 wherein steps (a) and (c) are performed, for each power phase, at least once per AC power phase cycle.

15. The method of claim 12 including a step of:
    d) monitoring the respective electrode currents to determine if the monitored currents exhibit characteristics predictive of loss of arc in the respective electrode and lowering the respective electrode and reducing the inductance of the respective variable reactor to prevent loss of arc.

16. The method of claim 12 wherein the arc furnace applies three phase power to three respective pairs of electrodes, a variable reactance being connected intermediate respective phases of the power source and the three pairs of electrodes, the respective electrode impedance being an impedance of the respective electrode pair.

17. An AC electric arc furnace comprising:
    a) a three phase power source;
    b) three variable reactances connected to respective phases of the three phase power source;
    c) a furnace transformer having primary windings and secondary windings and taps for adjusting the transformer ratio, the primary windings being connected to the three variable reactances;
    d) three arc electrodes connected to the secondary windings;
    e) a furnace vessel for receiving work material, the electrodes having arcing ends disposed within and spaced apart from the vessel, whereby application of power from the power source to the electrodes causes generation of respective electrical arcs from each of the electrodes for processing the work material;

f) an electrode movement device for adjusting the height of the electrodes relative to the furnace vessel; and g) a power control system for:
   i) setting the transformer taps so as to match an anticipated power consumption of the furnace to a predetermined power consumption; and
   ii) monitoring operating characteristics of the furnace that are indicative of an active power consumption during operation of the furnace and adjusting the variable reactances and the electrode height so as to minimize variations in the active power consumption relative to the predetermined power consumption.

18. The arc furnace of claim 17 wherein the variable reactances are adjusted at least once per respective AC power phase cycle.

19. The arc furnace of claim 17 wherein the furnace transformer includes three single phase transformers, each having a primary winding connected to a respective one of the three variable reactances, and including a pair of arc electrodes connected to a secondary winding of each of the single phase transformers.

20. A power control system for an AC electric arc furnace having an AC power source for applying power to an arc electrode, comprising:

an arc electrode movement device for adjusting the height of the electrode to control the arc length thereof; and an electrode position controller for controlling the operation of the electrode movement device, the position controller being configured to monitor operating characteristics of the arc furnace to predict the onset of a plurality of upset conditions and cause the electrode height to be adjusted in response to a specific predicted upset condition.

21. The power control system of claim 20 wherein the electrode position controller is configured to monitor electrode movement and arc length and cause the movement device to reduce a speed at which the electrode is moved in the event that the electrode position controller determines that the electrode may travel, or has travelled, past its arc length.

22. The power control system of claim 20 wherein the electrode position controller is configured to monitor an impedance of the electrode, detect an upset condition when the monitored impedance varies a predetermined amount from a threshold value, and cause the electrode height to be adjusted so that the monitored impedance is adjusted to within a predetermined range of the threshold value.

23. The power control system of claim 22 wherein the furnace has a three phase power source or applying power to three respective electrodes, the electrodes being independently movable by the arc electrode movement device, the electrode position controller being configured to monitor for each power phase the impedance of the respective electrode and to move independently for each power phase the respective electrode so as to allow the impedance of the electrodes to be adjusted to predetermined levels.

24. The power control system of claim 22 wherein the electrode position controller is configured to detect a different upset condition when the monitored operating characteristics are indicative of the electrode being positioned too far above a work material in the furnace, and cause the electrode height to be adjusted downward to an acceptable level.

25. The power control system of claim 22 wherein the furnace has a three phase power source for applying power to three respective electrodes that are movable by the arc electrode movement device, the electrode position controller being configured to monitor a current for each electrode and detect a different upset condition when the differences between the monitored electrode currents exceed predetermined thresholds and cause the height of the electrodes to be adjusted so that the differences between the monitored electrodes fall within a predetermined range.

26. A method for controlling an AC arc furnace having an AC power source for applying power to an arcing electrode, a variable reactance connected intermediate the power source and the electrode, and an electrode movement system for adjusting the height of the electrode relative to a furnace vessel, comprising the steps of:

a) monitoring a current fed to the electrode; and b) causing the electrode to be lowered and the variable reactance to be reduced when the magnitude of the monitored current decreases at a rate that exceeds a predetermined rate threshold and the magnitude of the monitored current is less than a predetermined value.

27. The method of claim 26 including the step of:

c) subsequent to step (b), increasing the value of the variable reactance so as to reduce a positive power swing when ionization for the electrode has been restored.

28. A power control system for an AC electric arc furnace having an AC power source for applying active AC power to an arc electrode, comprising:

a variable reactance intermediate the AC power source and the electrode; and a variable reactor controller for monitoring an impedance of the electrode and causing the variable reactance to vary in response to changes in the monitored electrode impedance so as to reduce variations in the active AC power provided to the electrode;

an electrode movement device for raising and lowering the electrode to control the length of the arc produced thereby; and an automated electrode position controller for controlling the operation of the electrode movement device, the electrode position controller being configured to monitor operating characteristics of the furnace and select from a plurality of different operating modes for controlling movement of the electrode based on the monitored operating characteristics.

29. A method for controlling an arc furnace having multiple phase AC power source for applying power to a plurality of arcing electrodes and having variable reactances connected intermediate respective phases of the power source and the three electrodes, comprising the steps of:

a) monitoring, for each of the multiple power phases, a respective electrode impedance;

b) adjusting the inductance of the variable reactances to compensate for variations in the respective electrode impedances so as to reduce fluctuations in an active power drawn from the power source; and c) monitoring the respective electrode currents to determine if the monitored currents exhibit characteristics predictive of loss of arc in the respective electrode and lowering the respective electrode and reducing the inductance of the respective variable reactor to prevent loss of arc.

* * * * *